(No Model.)

W. G. LAWRENCE.
GRAIN DRILL.

No. 499,025. Patented June 6, 1893.

WITNESSES:
F. L. Ourand
Jo. L. Coombs

INVENTOR:
Wm. G. Lawrence,
by Sums Jagger & Co.
Attorneys.

UNITED STATES PATENT OFFICE.

WILLIAM G. LAWRENCE, OF AGNES, TEXAS.

GRAIN-DRILL.

SPECIFICATION forming part of Letters Patent No. 499,025, dated June 6, 1893.

Application filed December 13, 1892. Serial No. 454,982. (No model.)

*To all whom it may concern:*

Be it known that I, WILLIAM G. LAWRENCE, a citizen of the United States, and a resident of Agnes, in the county of Parker and State of Texas, have invented certain new and useful Improvements in Grain-Drills; and I do hereby declare that the following is a full, clear, and exact description of the invention, which will enable others skilled in the art to which it appertains to make and use the same, reference being had to the accompanying drawings, which form a part of this specification.

My invention relates to grain drills, the object being to provide an improved construction of the same, whereby I secure important and superior advantages with respect to simplicity and efficiency.

The invention consists in the novel construction and combination of parts hereinafter fully described and claimed.

Figure 1:
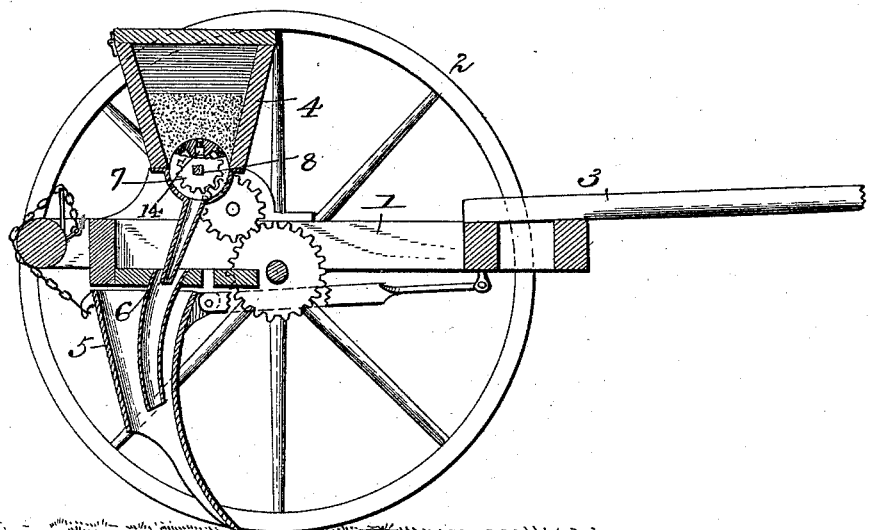
Figure 3:
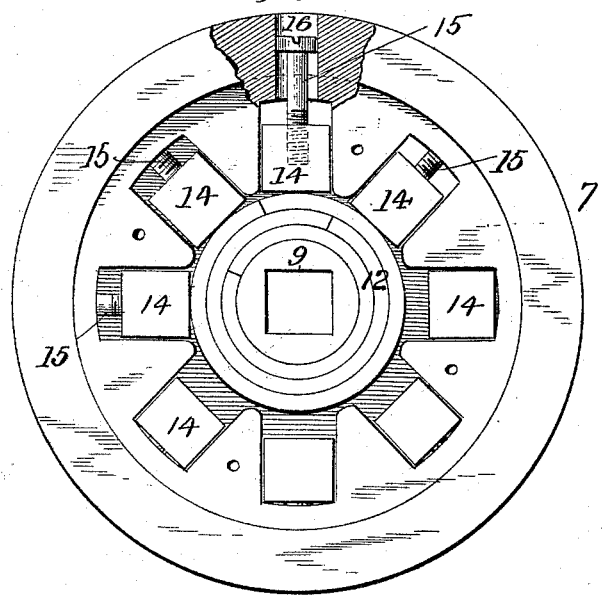
Figure 2:
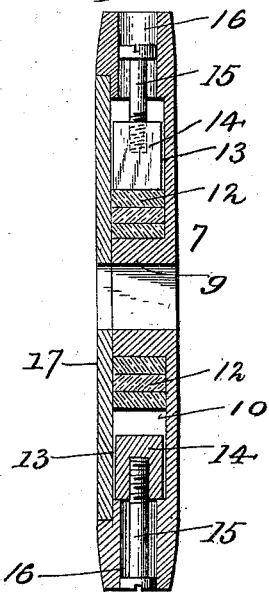

In the accompanying drawings: Figure 1 is a sectional elevation of an ordinary grain drill showing my invention applied thereto. Fig. 2 is a central transverse section of one of the grain wheels removed, on an enlarged scale. Fig. 3 is a side view of the same, the disk or annular plate being removed.

In the said drawings the reference numeral 1 denotes the frame, 2 the supporting and driving wheel, 3 the tongue, 4 the hopper, 5 the hollow share, and 6 the seed spout, all of which may be of any ordinary or suitable construction.

The numeral 7 denotes the feed-wheel, mounted upon the shaft 8, extending transversely across the machine underneath the hopper and rotated by suitable gearing connected with the driving-wheel. The feed-wheels project up through slots in the bottom of the hopper as usual. These feed-wheels each consist of a metal disk having a central hub 9, through which the shaft 8 passes. Surrounding this hub is an annular recess 10 to receive the sectional washers 12.

The numeral 13 designates a series of radial slots communicating with said recess, in which are seated gravity slides 14, provided with stems 15, which project into radial apertures or holes 16, which receive the seed from the hopper. A covering disk or plate 17 is secured to one side of the wheel by means of screws or otherwise, said side being recessed so as to form a seat therefor.

The operation is as follows: As the feed-wheels are rotated, the seed apertures in the peripheries thereof are successively brought into the hopper, when the slides falling by gravity allow the seed to enter. As the wheels continue their rotation the seed apertures come in line or register with the seed spouts when the slides will fall outwardly and the stems thereof will force the grain out of said apertures into the seed spouts. The washers 12 which regulate the play of the slides and consequently increase or decrease the area of the seed apertures, consist of segmental pieces of metal or other suitable material. By decreasing or increasing the number of these segments the play of the slides is regulated and more or less grain deposited in the seed apertures. These feed wheels can be readily applied to the ordinary grain drills now in use.

Having thus described my invention, what I claim is—

A feed-wheel for grain drills consisting of the disk having a central hub, an annular recess surrounding the same, the segmental washers, the radial slots, the radial seed apertures and the gravity slides, provided with stems, substantially as described.

In testimony that I claim the foregoing as my own I have hereunto affixed my signature in presence of two witnesses.

WILLIAM G. LAWRENCE.

Witnesses:
   H. A. MIDDLETON,
   J. J. NELSON.